(12) United States Patent
Kondoh (10) Patent No.: US 7,052,526 B2
(45) Date of Patent: May 30, 2006

(54) MAGNESIUM BASE COMPOSITE MATERIAL AND ITS MANUFACTURING METHOD

(75) Inventor: Katsuyoshi Kondoh, Yokohama (JP)

(73) Assignee: Toudai TLO, Ltd., Tokyo (JP)

( * ) Notice: Subject to any disclaimer, the term of this patent is extended or adjusted under 35 U.S.C. 154(b) by 0 days.

(21) Appl. No.: 10/503,730

(22) PCT Filed: Feb. 14, 2003

(86) PCT No.: PCT/JP03/01612

§ 371 (c)(1),
(2), (4) Date: Aug. 6, 2004

(87) PCT Pub. No.: WO03/069001

PCT Pub. Date: Aug. 21, 2003

(65) Prior Publication Data

US 2005/0089435 A1    Apr. 28, 2005

(30) Foreign Application Priority Data

Feb. 15, 2002  (JP) ............................. 2002-037983

(51) Int. Cl.
*C22C 23/00* (2006.01)
(52) U.S. Cl. ............................. 75/235; 75/231; 75/249; 419/19; 419/32; 419/33; 419/44; 419/45
(58) Field of Classification Search .................. 75/231, 75/235, 249; 419/19, 32, 33, 44, 45
See application file for complete search history.

(56) References Cited

U.S. PATENT DOCUMENTS

| | | | | |
|---|---|---|---|---|
| 3,119,684 A | * | 1/1964 | Foerster | 148/420 |
| 3,119,725 A | * | 1/1964 | Foerster | 148/538 |
| 5,273,569 A | * | 12/1993 | Gilman et al. | 75/230 |
| 5,791,397 A | * | 8/1998 | Suzuoki et al. | 164/97 |

FOREIGN PATENT DOCUMENTS

| | | |
|---|---|---|
| EP | 1 057 901 A2 | 12/2000 |
| JP | 57-47843 | 3/1982 |
| JP | 63-42338 | 2/1988 |
| JP | 6-81068 | 3/1994 |
| JP | 7-310131 | 11/1995 |
| JP | 8-41564 | 2/1996 |
| JP | 2000-17352 | 1/2000 |

OTHER PUBLICATIONS

Katsuyoshi Kondo et al., Kangen Hanno o Riyo shita $Mg_2Si/MgO$ Gosei Process (First Report), Japan Society of Powder and Powder and Powder Metallurgy Koen Gaiyoshu, Oct. 30, 2001, Heisel 13 nendo Shuki, p. 61.
Katsuyoshi Kondo et al., Kangen Hanno o Riyo shita $Mg_2Si/MgO$ Gosei Process (Second Report), Japan Society of Powder and Powder and Powder Metallurgy Koen Gaiyoshu, Oct. 30, 2001, Heisel 13 nendo Shuki, p. 62.
Akihiro Yamazaki et al., "Mechanical Alloying-ho ni yoru $Mg$-$SiO_2$ Kel no Koso Hanno", Journal of the Japan Society of Powder and Powder Metallurgy, Jan. 15, 2001, vol. 48, No. 1, pp. 61-66.
Katsuyoshi Kondo et al., "$Mg_2Si$ no Koso Gosel ni Oyobosu Huntai Tokusel oyobl Atsufun Joken no Eikyo" Journal of the Japan Society of Powder and Powder Metallurgy, Sep. 15, 2001, vol. 48, No. 9, pp. 816-823.
XP009046791: "Tribological Property of Mg Composites via Powder Metallurgy Process" by Hiroshi Muramatsu et al.; *Materials Science Forum*; vols. 419-422; pp. 801-804; c. 2003.
XP001206248: "Fabrication of particulate reinforced magnesium composites by applying a spontaneous infiltration phenomenon" by Hiromitsu Kaneda et al.; *Journal of Materials Science*; vol. 32; pp. 47-56; c. 1997.
XP002326011: "Spontaneous Infiltration velocity in fabrication process of particulate reinforced magnesium composites" by Hiromitsu Kaneda et al.; *Journal of the Japan Institute of Light Metals*; vol. 45; No. 10; c. 1995.
XP001125403: "Polysiloxane-derived ceramic foam for the reinforcement of Mg alloy" by Juergen Zeschky et al.; *Zeitschrift fur Metallkunde*; vol. 2117; pp. 812-818; c. 2002.

* cited by examiner

Primary Examiner—Ngoclan T. Mai
(74) *Attorney, Agent, or Firm*—Clark & Brody (57) ABSTRACT

A magnesium base composite material is provided such that compound particles generated by a solid-phase reaction with magnesium are uniformly dispersed in a magnesium alloy body. The compound particles dispersed in the body comprise magnesium silicide ($Mg_2Si$) and magnesium oxide ($MgO$) so that the magnesium base composite material may have excellent strength, hardness and abrasion resistance and tempered opponent aggression.

15 Claims, 5 Drawing Sheets

FIG.1

(a) Starting raw material
(mixed powder of Mg powder and Silica glass powder)

(b) Mixed powder after a vacuum heating treatment

MAGNESIUM BASE COMPOSITE MATERIAL AND ITS MANUFACTURING METHOD

TECHNICAL FIELD

The present invention relates to a magnesium base composite material having excellent mechanical characteristics and corrosion resistance, and its manufacturing method.

BACKGROUND ART

Conventionally, research and development regarding a magnesium base composite material in which magnesium silicide ($Mg_2Si$) particles are dispersed has been energetically carried out. For example, Japanese Unexamined Patent Publication No. 6-81068 discloses a method of manufacturing a magnesium base composite material in which $Mg_2Si$ is synthesized by a reaction of Mg of a matrix and Si when a magnesium alloy of high Si content is injection-molded in a semi-solid state, and the $Mg_2Si$ particles are dispersed.

In addition, Japanese Unexamined Patent Publication No. 8-41564 discloses a magnesium base composite material provided by a casting method, in which $Mg_2Si$ particles and SiC particles are dispersed. In addition, Japanese Unexamined Patent Publication No. 2000-17352 discloses a magnesium base composite material in which spherical $Mg_2Si$ particles are dispersed and its manufacturing method by a casting method.

However, all of the above manufacturing methods of the magnesium base composite material are based on a dissolution method such as casting method or an impregnating method. That is, according to the above methods, after magnesium or a magnesium alloy constituting the matrix is dissolved once, it is coagulated and solidified. Therefore, it is observed that the crystal grain diameter of magnesium of the matrix and the $Mg_2Si$ particles are coarsely grown, and mechanical characteristics such as strength, hardness and the like are lowered.

Furthermore, according to the above manufacturing methods based on the dissolution method, consumption energy of itself, and especially consumption energy when recycling is considered are surely increased, so that there is a problem regarding costs.

Meanwhile, the inventors of the present invention have proposed a method in which mixture powder provided by combining matrix powder comprising magnesium (Mg) with silicon (Si) powder is pressed to be molded by powder metallurgy technique and this is heated and held at an appropriate solid-phase temperature which is less than a melting point of Mg in a controlled heating atmosphere to generate fine $Mg_2Si$ by reaction between Mg and Si powder, so that the fine $Mg_2Si$ are dispersed in a matrix. More specifically, "magnesium base composite material, magnesium base composite material precursor, and their manufacturing method" was applied for patent as Patent Application No. 2001-292117, on Sep. 25, 2001 and "magnesium base composite material, magnesium base composite material precursor, and their manufacturing method" was applied for patent as Patent Application No. 2001-292118, on Sep. 25, 2001. These applications are not laid open at this point.

According to the magnesium base composite material provided by the above method proposed by the inventors of the present invention, since fine $Mg_2Si$ particles are uniformly dispersed, mechanical characteristics such as strength or hardness of the composite material is improved, and since hard $Mg_2Si$ particles are uniformly dispersed, abrasion resistance of the composite material can be improved.

However, when this composite material is used as a material for frictional sliding component, although the abrasion resistance of the composite material itself is improved, there is a problem in which it makes an attack on an opponent material when the opponent material is a relatively soft material.

DISCLOSURE OF INVENTION

Thus, it is an object of the present invention to provide a magnesium base composite material having further improved characteristics. Especially, it is an object of the present invention to provide a magnesium base composite material which is superior in strength, hardness and abrasion resistance and also has improved opponent aggression.

Furthermore, it is an object of the present invention to provide a method of manufacturing the magnesium base composite material other than the above objects or in addition to the above objects.

As a result of keen examinations, the inventors of the present invention found that the above problems could be solved by constitution as would be described below.

That is, a magnesium base composite material according to the present invention comprises magnesium silicide ($Mg_2Si$), magnesium oxide (MgO) and magnesium.

The magnesium base composite material may further comprise a $SiO_2$ component.

Preferably, the $Mg_2Si$ and MgO are uniformly dispersed in the magnesium base composite material.

In addition, preferably, 3 or more parts by weight of the $Mg_2Si$ is comprised in 100 parts by weight of the magnesium base composite material. Further preferably, 3 or more parts by weight of the MgO is comprised in 100 parts of the magnesium base composite material.

According to a preferred embodiment, in a magnesium base composite material in which compound particles generated by a solid-phase reaction with magnesium are uniformly dispersed in a magnesium alloy body, the compound particles comprise magnesium silicide ($Mg_2Si$) and magnesium oxide (MgO). The compound particles may further comprise $SiO_2$ component.

Preferably, 3 to 15 parts by weight of the magnesium silicide is comprised in 100 parts by weight of the magnesium group composite material. Further preferably, 5 to 8 parts by weight of the magnesium silicide is comprised.

Preferably, 3 to 15 parts by weight of the magnesium oxide is comprised in 100 parts by weight of the magnesium group composite material. Further preferably, 5 or more parts and 8 or less parts of the magnesium oxide is comprised.

The magnesium base composite material may comprise graphite powder as a solid lubricating agent. In this case, a graphite powder content is 0.5 to 3% by weight in the magnesium base composite material.

A method of manufacturing a magnesium base composite material according to the present invention comprises a step of providing a mixture by mixing a first material comprising magnesium (Mg) and a second material containing a $SiO_2$ component, a step of providing a pressed powder molded body by putting the mixture into a predetermined container or a mold and applying pressure thereto and a step of heating the pressed powder molded body in an inert gas atmosphere or in vacuum, in which magnesium silicide ($Mg_2Si$) and magnesium oxide (MgO) are generated by a reaction of Mg and $SiO_2$ in the mixture at the heating step to manufacture the magnesium base composite material comprising $Mg_2Si$, MgO and Mg.

Preferably, a heating temperature at the heating step is 250° C. or more. In addition, preferably, $Mg_2Si$ and MgO are uniformly dispersed in the magnesium base composite material.

The magnesium group composite material may further comprise $SiO_2$. In this case, preferably, $SiO_2$ is uniformly dispersed in the magnesium base composite material.

Preferably, 3 or more parts by weight of $Mg_2Si$ is contained in 100 parts by weight of the magnesium base composite material. In addition, preferably, 3 or more parts by weight of MgO is contained in 100 parts by weight of the magnesium base composite material.

According to a preferred embodiment, a method of manufacturing a magnesium base composite material comprises a step of providing a mixture by mixing a first material comprising magnesium and a second material containing a $SiO_2$ component, a step of providing a pressed powder molded body by applying pressure to the mixture and a step of heating the pressed powder molded body in an inert gas atmosphere or in vacuum to generate magnesium silicide ($Mg_2Si$) and magnesium oxide (MgO) in a magnesium alloy body by a reaction of Mg and $SiO_2$ in the pressed powder molded body.

A step of grinding the mixture may be provided prior to the step of providing the pressed powder molded body. Furthermore, a step of pressure bonding the mixture may be provided after the step of grinding the mixture. Still further, a step of crushing the mixture may be provided after the step of pressure bonding the mixture.

Preferably, a heating temperature of the pressed powder molded body is 250° C. or more and not more than a melting point of magnesium.

A step of forming a new phase in magnesium in the first material by grinding and/or pressure bonding and/or crushing the mixture may be further provided prior to the step of providing the pressed powder molded body.

BEST MODE FOR CARRYING OUT THE INVENTION

Hereinafter, the present invention is described in detail. In addition, descriptions are made of a magnesium base composite material and its manufacturing method in this order in the present invention.

<Magnesium Base Composite Material>

A magnesium base composite material of the present invention comprises magnesium silicide ($Mg_2Si$), magnesium oxide (MgO) and magnesium.

$Mg_2Si$ contained in the composite material of the present invention has a coefficient of thermal expansion lower than that of magnesium, high rigidity, high hardness and low specific gravity and it is superior in heat resistance and corrosion resistance.

Fine particles of $Mg_2Si$ are preferably dispersed uniformly in the composite material of the present invention.

When the composite material of the present invention comprises fine particles of $Mg_2Si$, and comprises uniformly dispersed fine particles of $Mg_2Si$ in particular, mechanical characteristics (strength and/or hardness, for example), wear resistance and corrosion resistance thereof can be improved. In addition, according to this specification, uniformly dispersed $Mg_2Si$ means that a distance between the particles of $Mg_2Si$ is about 300 μm at a maximum. However, the particles of $Mg_2Si$ must not agglutinate, segregate nor form networks. As the distance between the particles of $Mg_2Si$ is decreased, the mechanical characteristics such as tensile strength are improved.

The material of the present invention comprises 3 or more parts by weight, and preferably 5 or more parts by weight of $Mg_2Si$ based on 100 parts by weight of the material. In addition, when the content of $Mg_2Si$ in the material of the present invention is large, the mechanical characteristics such as the strength and the like can be improved, but in view of machinability of the composite material itself and/or non-prominence of the mechanical characteristics (saturation of characteristics improvement), the composite material may comprise 15 or less parts, and preferably 8 or less parts by weight of $Mg_2Si$ based on 100 parts by weight of the material.

Similar to $Mg_2Si$, MgO contained in the composite material of the present invention can improve the mechanical characteristics (strength and/or hardness, for example) of the composite material. In addition, MgO can improve opponent aggression.

The composite material of the present invention preferably comprises uniformly dispersed fine particles of MgO. When the particles are uniformly dispersed, the mechanical characteristic of the composite material can be further improved and the opponent aggression can be further improved. In addition, since an oxide particle containing MgO has low hardness in general as compared with other nonoxide ceramics (nitride, carbide, boride and the like), when it is rubbed against an opponent material, it does not attack the opponent material aggressively.

The material of the present invention may comprise 3 or more part, and preferably 5 or more parts by weight of MgO based on 100 parts by weight of the material. In addition, when the content of MgO in the material of the present invention is large, the mechanical characteristics such as the strength and the like can be improved, but in view of machinability of the composite material itself and/or non-prominence of the mechanical characteristics (saturation of characteristics improvement), the composite material may comprise 15 or less, and preferably 8 or less parts by weight of MgO based on 100 parts by weight of the material. In addition, according to this specification, uniformly dispersed MgO means that a distance between the particles of MgO is about 300 μm at a maximum.

Thus, when the composite material of the present invention comprises fine particles of MgO, and comprises uniformly dispersed fine particles of MgO in particular, mechanical characteristics (strength and/or hardness, for example) can be improved and a desired improvement on the opponent aggression can be added to the composite material. That is, the opponent aggression, which is too high in a composite material comprising only Mg and $Mg_2Si$, can be improved. Therefore, the composite material of the present invention can be used as a material for a frictional sliding component.

When the material of the present invention is used as the material for the frictional sliding component, a relatively soft material such as a magnesium alloy, an aluminum alloy, a copper alloy and the like can be used as the opponent material, depending on the content of MgO in the material of the present invention or the opponent aggression of the material of the present invention though.

The magnesium base composite material of the present invention may comprise a $SiO_2$ component as required. Since $SiO_2$ is an oxide, similar to MgO as described above, when it is dispersed in the magnesium base composite material, the opponent aggression can be improved.

The magnesium base composite material of the present invention may comprise various kinds of components other than the above components. For example, although there are Al, Zn, Mn, Zr, Ce, Li and Ag as the various kinds of metal, the present invention is not limited to these. That is, the various kinds of components contained in the composite material of the present invention may be the above metal alloys or may be a compound of the oxide and the like. The characteristics of the composite material can be varied or adjusted when the composite material comprises those components.

When a coefficient of friction is to be lowered, the magnesium base composite material preferably comprises graphite powder as a lubricating agent. The magnesium base composite material preferably comprises 0.5 to 3% by weight of graphite.

<Manufacturing Method of Magnesium Base Composite Material>

The magnesium base composite material of the present invention is manufactured by the following steps. More specifically, a method according to the present invention comprises a step of providing a mixture by mixing a first material comprising magnesium (Mg) and a second material containing a $SiO_2$ component, a step of forming a pressed powder molded body by filling a predetermined container or a mold with the mixture and pressing it, and a step of heating the pressed powder molded body in an inert gas atmosphere or in vacuum.

When Mg reacts with $SiO_2$ in the mixture at the heating step, magnesium silicide ($Mg_2Si$) and magnesium oxide (MgO) are generated, whereby there is provided the magnesium base composite material comprising $Mg_2Si$, MgO and Mg.

<Mixing Step>

A description is made of materials used at the mixing step in the above method.

At the mixing step, a first material comprising magnesium (Mg) and a second material containing $SiO_2$ component are used.

An alloy containing Mg or pure Mg is contained in the first material comprising magnesium (Mg). When only pure Mg is used, powder having a particle diameter of 10 μm is preferably used in view of explosion-proof against explosion of fine particles and the like. When this point is satisfied, the form of the first material comprising Mg is not especially limited, but it is preferably powder, a chip, a block piece or the like.

When the fist material comprising Mg is an alloy, although there are Al, Zn, Mn, Zr, Ce, Li, Ag and the like as materials other than Mg, the present invention is not limited to these. For example, as an alloy containing Mg, there is an industrial magnesium alloy such as AZ31, AZ91 and the like.

The second material containing $SiO_2$ component includes a glass such as a silica glass containing the $SiO_2$ component, and silica comprising only the $SiO_2$ component.

In addition, when the silica glass comprising the $SiO_2$ component, for example is used as the second material, the silica glass preferably comprises 90 parts by weight of the $SiO_2$ component, which is a main component of the silica glass, based on 100 parts by weight of the silica glass.

In addition, when the silica glass or the like is used, it is preferable that a component which adversely affects the characteristics of the composite material and/or the manufacturing method of the present invention is not contained in the glass. For example, there is $Fe_2O_3$ as a component which adversely affects the above. If $Fe_2O_3$ is contained, the $Fe_2O_3$ is reduced by Mg, so that undesired Fe exists in the composite material of the present invention. Since the Fe causes strength, corrosion resistance and the like to be lowered, it is not preferable in the present invention.

In addition, the mixture of the first and second materials preferably comprises 2.5 to 12 parts by weight of the $SiO_2$ component based on 100 parts by weight of, in total, the materials.

The form of the second material containing the $SiO_2$ component, and the particle diameter in particular, are not particularly limited. That is, the form ranging from a block-shaped large sample in several centimeters to fine particles in several microns crushed by mechanical processing can be used. In addition, the second material has a particle diameter of 10 to 500 μm, and preferably 10 to 200 μm in view of improvement of mechanical bonding with the first material at the step of forming the pressed powder molded body as will be described below.

In addition, when silica, and the glass containing the $SiO_2$ component in particular are used as the second material, since its raw material is inexpensive, a price of the magnesium base composite material which is a final product can be considerably lowered.

Although the first and second materials may be mixed by a conventional mixing and grinding machine such as a V-shaped mixer, a ball mill and the like, the present invention is not limited to these.

The mixing process may be performed under various kinds of circumstances, for example in the air. When fine particles are used, it is preferable that oxidation of the powder surface and oxidation of the surface of Mg powder in particular at the mixing step is prevented by filling the mixture container with inert gas such as nitrogen gas, argon gas or the like. In addition, as described above, the mixture is preferably made such that $Mg_2Si$ and/or MgO are uniformly dispersed in the composite material.

After the mixing step, a step of grinding and/or pressure bonding and/or crushing may be added before the step of forming the pressed powder molded body as will be describe below. In addition, this grinding and/or pressure bonding and/or crushing step may be repeatedly performed.

The grinding, pressure bonding and crushing step is preferably performed in a grinding machine. The grinding machine preferably has a mechanical grinding ability which uses impact energy by ball media, which may be selected from a group consisting of a rotary ball mill, a vibratory ball mill, a planetary ball mill and the like. Through the mechanical grinding, mixing, pressure bonding and crushing processes, the first and second materials are crushed finely and Mg and $SiO_2$ component can be uniformly dispersed.

Besides, a new phase can be formed in Mg in the first material containing Mg by the grinding, pressure bonding and crushing step. That is, the surface of the pure Mg powder or the Mg alloy powder is covered with an oxide layer (MgO). Since this MgO has small free energy of formation and it is stable as compared with another oxide, the MgO surface layer existing on the powder surface prevents Mg from reacting with $SiO_2$ component as will be described below. However, inventors of the present invention found that an active new phase of Mg could be formed by mechanically separating and destroying the surface oxide film, that is, the MgO surface film at the grinding, pressure bonding and crushing step. As a result, the inventors found that fine $Mg_2Si$ and MgO could be synthesized at a temperature range lower than a melting point of Mg (650° C.), that is, in a solid-phase state at the heating step as will be described below. In addition, it was found that as an area of the new phase of Mg became larger, a synthesis temperature of $Mg_2Si$/MgO was moved to the lower side. In other words, when the fine pressed powder molded body is formed by the grinding, pressure bonding and crushing step and/or the step of forming the pressed powder molded body as will be described below, it is advantageous for reaction of synthesis of fine $Mg_2Si$/MgO at a lower temperature.

<Step of Forming Pressed Powder Molded Body>

After the mixing step, the mixture provided as described above proceeds to the step of forming the pressed powder molded body. At the step of forming the pressed powder molded body, the above mixture is put in a predetermined container or a mold and then pressed.

A process used in a conventional powder metallurgy method may be applied to the step of forming the pressed powder molded body from the above mixture. For example, although there are a method in which a container is filled with the mixture and then cool isostatic pressing (CIP) is performed, a method of manufacturing a pressed powder body by compressing the mixture put in a mold by upper and lower punches, and a solidification method in which warm molding is performed on the mixture heated at approximately 100 to 200° C., the present invention is not limited to these.

<Heating Step>

After the step of forming the pressed powder molded body, the pressed powder molded body is heated in the inert gas atmosphere or in vacuum.

At this heating step, $Mg_2Si$ and MgO are generated by oxidation-reduction reaction shown by the following formula I and thus the magnesium group composite material of the present invention is provided.

$4Mg+SiO_2 \rightarrow Mg_2Si+2MgO$ (formula I)

Although a heating atmosphere is not particularly limited, it is preferable that the heating step is performed in the atmosphere of inert gas such as nitrogen or argon, or in vacuum in order to prevent oxidation of Mg or the alloy containing Mg in the pressed powder molded body.

A heating temperature is preferably 250° C. or more. In addition, in order to synthesize $Mg_2Si$ and MgO for a relatively short time, for example, the heating temperature may be 450° C. or more.

The reduction reaction of $SiO_2$ by Mg progresses at this heating temperature and as a result, $Mg_2Si$ and MgO are synthesized as shown by the formula I. Since the heating temperature is sufficiently lower than the melting point (650° C.) of Mg, synthesizing reaction of $Mg_2Si$ and MgO can progress at a solid-phase temperature.

If required, the temperature may be remained at a certain temperature reaching the maximum heating temperature and/or at the maximum temperature, depending on a size of a desired material, for example.

By the above method, $Mg_2Si$ and MgO can be synthesized in the solid-phase state without generating Mg liquid phase by the powder metallurgy method and as a result, Mg which is a matrix of the composite material has fine crystal grains and $Mg_2Si$ and MgO are finely dispersed in the matrix, so that the magnesium group composite material which is superior in mechanical characteristics and corrosion resistance can be economically manufactured. In addition, there is a merit such that since the liquid phase of Mg does not appear, a dimension variation between the pressed powder molded body and the composite material provided after the heating process is small.

As an example, magnesium powder (average particle diameter: 110 µm) and silica powder (average particle diameter: 21 µm) were prepared and both were mixed so as to comprise 38% by weight of the silica powder. After the mixed powder was pressed and molded at a pressure of 600 MPa, the molded body was processed by a vacuum heating treatment, that was, it was held at the heating temperature of 530° C. for 10 minutes and then the composite material X-1 was provided.

Figure 1:
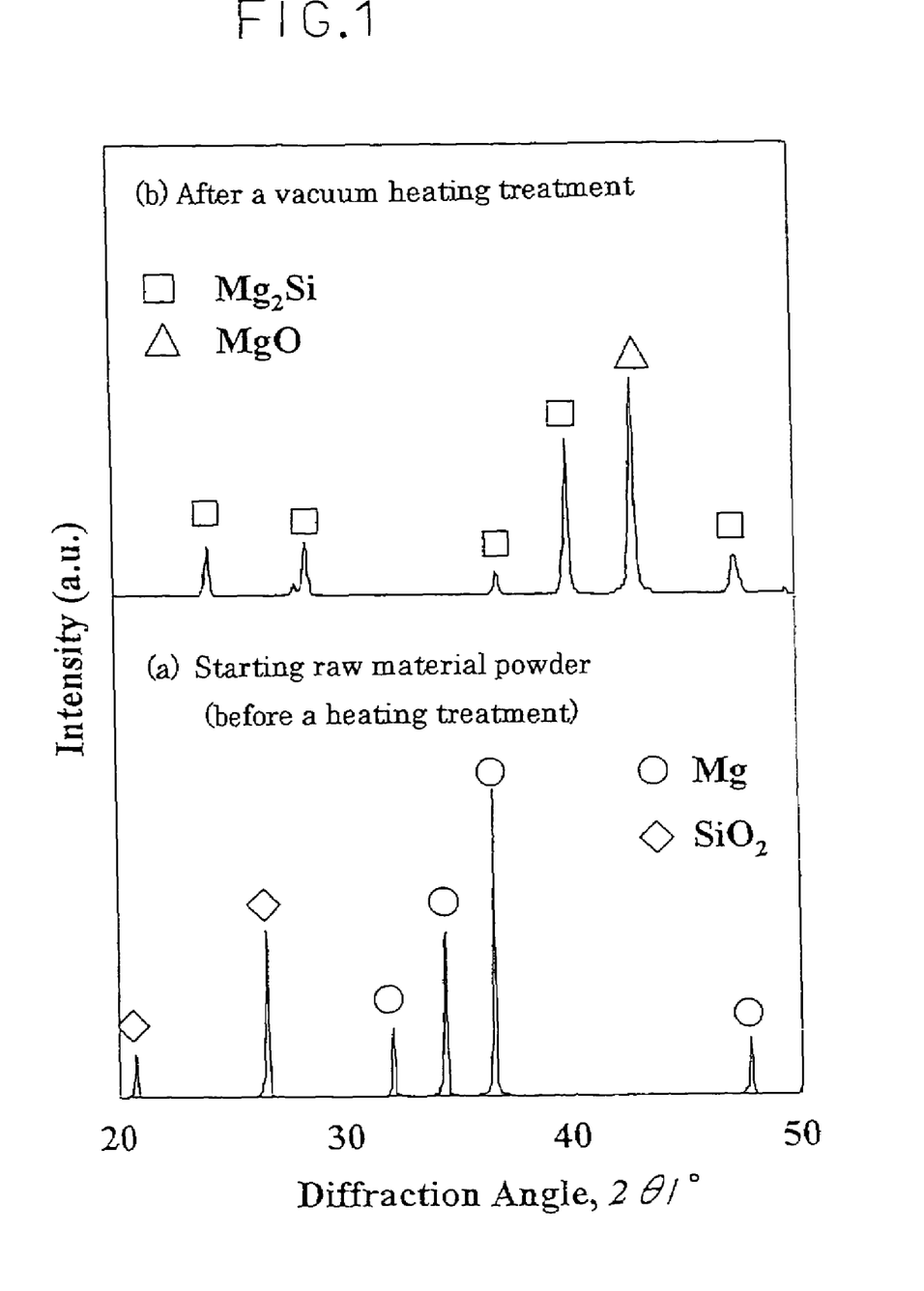
FIG. 1 shows results of X-ray diffraction for mixture powder before a heating treatment (a) and for sample powder after a vacuum heating treatment (b) in a composite material X-1.

It was evaluated and examined whether $Mg_2Si$ and MgO were synthesized in the composite material X-1 or not by X-ray diffraction (XRD). The result is shown in FIG. 1. In FIG. 1, (a) shows a XRD result of the mixed powder before the heating treatment and (b) shows a XRD result of the sample powder (composite material X-1) after the vacuum heating treatment. Referring to (a), only diffraction peaks of Mg and $SiO_2$ which constitute the raw material of the mixed powder are detected. Meanwhile, referring to (b), diffraction peaks of $Mg_2Si$ and MgO are observed in the sample powder after the vacuum heating treatment. Thus, it is shown that the oxidation-reduction reaction shown in the above formula (I) developed while heated and held at 530° C., and $Mg_2Si$ and MgO were synthesized.

In addition, as another example, a description is made of a case silica ($SiO_2$) having a particle diameter of about 183 µm was used as the second material.

A pressed magnesium powder body comprising only magnesium was previously prepared. Silica powder (particle diameter: about 183 µm) was embedded in the pressed powder body and processed by the vacuum heating treatment, that was, it was held at 530° C. for 10 minutes. Thus, a sample X-2 was provided.

Figure 2:
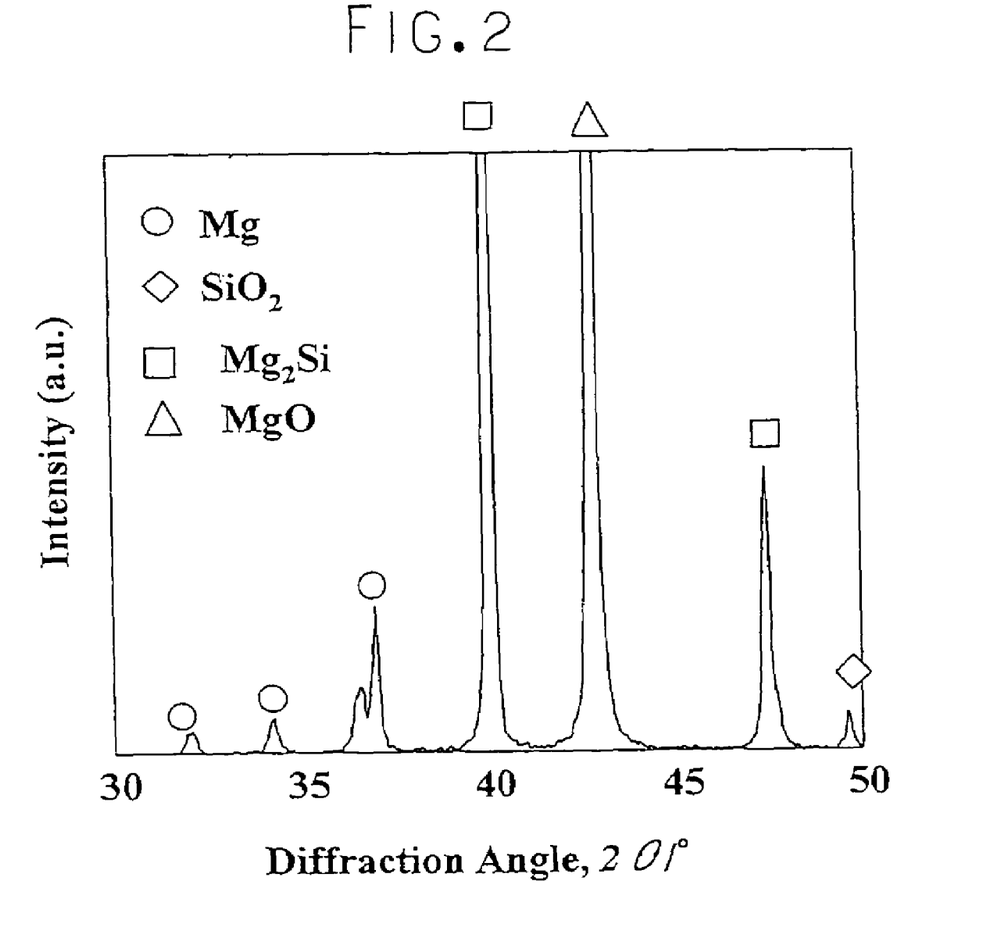
FIG. 2 is a view showing a result of X-ray diffraction for a sample X-2.

Then, the X-ray diffraction was performed on the provided sample X-2. The result is shown in FIG. 2. As can be seen from FIG. 2, a diffraction peak of $SiO_2$ was detected in addition to the diffraction peaks of Mg, $Mg_2Si$ and MgO in the sample X-2. Thus, it is shown that unreacted $SiO_2$ which is a starting raw material remains in the sample X-2.

Figure 3:
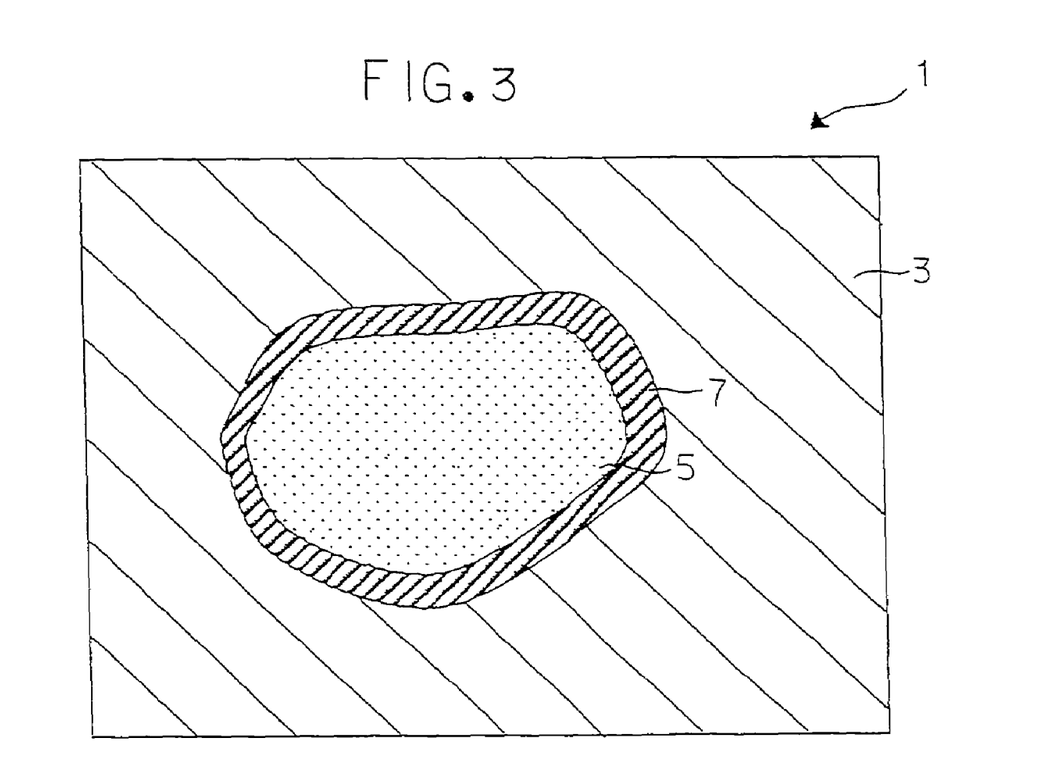
FIG. 3 is a schematic view showing an image of the sample X-2 taken by a scanning electron microscope.

In addition, the sample X-2, and especially unreacted $SiO_2$ remaining in the sample X-2 were examined by EDX surface microanalysis (Energy Dispersive X-ray spectroscopy) (components Si, Mg and O were examined, respectively). The result was photographed by a scanning electron microscope. The photograph taken by the scanning electron microscope was schematically shown in FIG. 3. In FIG. 3, reference numeral 1 designates a schematic view showing a photograph taken by the scanning electron microscope. As a result of the EDX surface microanalysis, only Mg was detected in a part shown by 3, and Si and O were detected but Mg was not detected in a part shown by 5 in which $SiO_2$ particles seem to exist. In addition, Si, O and Mg were detected in a part shown by 7. From the result of the EDX surface microanalysis shown in FIG. 3 and the result of X-ray diffraction shown in FIG. 2, it is considered that the part shown by 5 is $SiO_2$ and the part shown by 7 is $Mg_2Si$ and MgO. This shows that when the silica used as the raw material powder is coarse, the reduction reaction by Mg does not proceed into the $SiO_2$ particle because of the heating retention conditions and/or the raw material, and especially the particle diameter of $SiO_2$, so that $SiO_2$ remains in the center of the particle in some cases.

Accordingly, the magnesium base composite material in which unreacted $SiO_2$ is dispersed in addition to $Mg_2Si$ and MgO generated by synthesis reaction can be designed by controlling the particle diameter of the first material and/or the second material, for example controlling the particle diameter of $SiO_2$ of the second material.

Furthermore, as another example, a description is made of a case a silica glass was used as the second material.

Pure Mg powder (average particle diameter: 112 µm) and silica glass powder (average particle diameter: 62 µm) were prepared and both were mixed so as to comprise 10% by weight of the silica glass based on 100% by weight of the mixture. The vacuum heating treatment was performed on this mixed powder, that was, the mixed powder was heated and held at 600° C. for 10 minutes. As a result, a sample X-3 was provided.

Figure 4A:
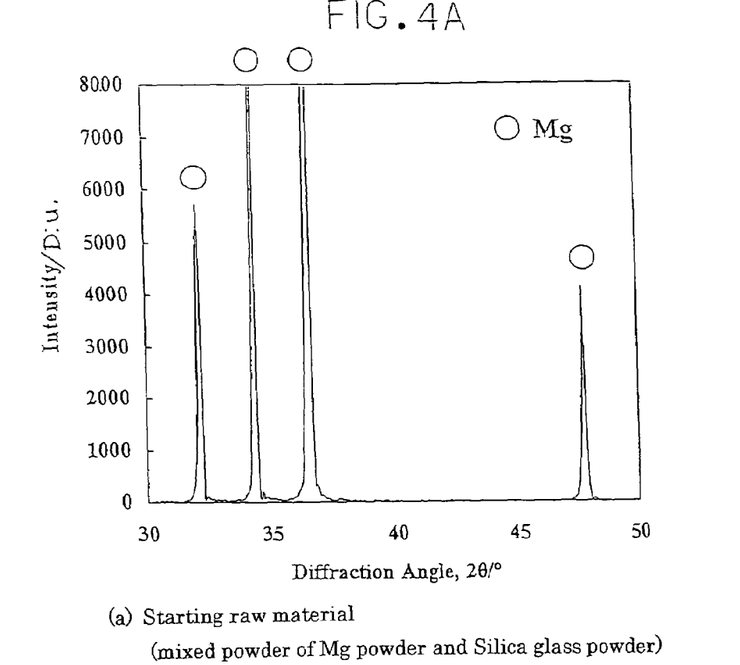
FIG. 4A is a view showing a result of X-ray diffraction for a sample X-3 before a heating treatment and FIG. 4B is a view showing a result of X-ray diffraction for the sample X-3 after a vacuum heating treatment.
Figure 4B:
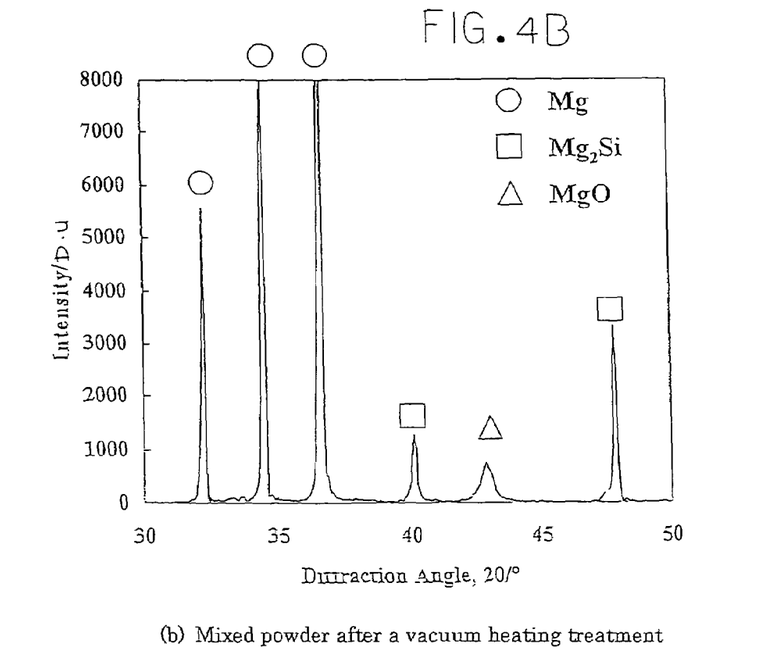

The X-ray diffraction was performed on the sample X-3. The results are shorn in FIGS. 4A and 4B. FIG. 4A is a result of the X-ray diffraction for the mixed powder before the heating treatment and FIG. 4B shows the result of the X-ray diffraction for the sample X-3 in which the vacuum heating treatment was performed. Since the silica glass is amorphous, its diffraction peak is not detected but only peaks of the other material Mg are detected in the mixed powder as shown in FIG. 4A. Meanwhile, diffraction peaks of $Mg_2Si$ and MgO are detected in addition to diffraction peaks of the raw material of Mg after the heating treatment as show in FIG. 4B. As can be seen from FIGS. 4A and 4B, even when the silica glass is used, the magnesium base composite material in which $Mg_2Si$ and MgO are dispersed can be manufactured.

Since the magnesium base composite material of the present invention and the magnesium base composite material manufactured by the method of the present invention have high hardness, high corrosion resistance, and excellent abrasion resistance as well as being light, and furthermore, they have tempered opponent aggression. Consequently, they can be applied to a structural component material such as car components or household electric appliances in which the above characteristics are required at the same time, for example.

(EXAMPLE)

Although the present invention is further described in detail with reference to examples hereinafter, the present invention is not limited to the following examples only.

(Example 1)

As a starting raw material, pure Mg powder (average particle diameter: 165 µm) and silica powder (average particle diameter: 58 µm) were prepared, and both were combined so as to comprise the silica powder at a ratio (% by weight) shown in a table 1 in 100% by weight of the mixture and uniformly mixed by a ball mill.

A circular mold which is 34 mm in diameter was filled with the provided mixed powder and a surface pressure of 6 $t/cm^2$ was applied to it. Thus, pressed powder molded bodies A-1 to A-7 were manufactured.

Other than the pressed powder molded bodies, a tubular furnace as would be described below was prepared. That was, the tubular furnace was filled with nitrogen gas (gas flow rate: 3 $dm^3$/min) and a temperature in the furnace was controlled at 480° C. The pressed powder molded bodies A-1 to A-7 were put in the tubular furnace and heated up and held for 10 minutes. Then, they were taken out of the furnace and immediately solidified to have a relative density of 99% or more by a powder forging method and solid bodies, that was, magnesium base composite materials B-1 to B-7 were provided. In addition, the conditions of the powder forging method was such that a mold temperature was 250° C. and the surface pressure was 8 $t/cm^2$ and a water-soluble lubricating agent was added to a wall surface of the mold in view of prevention of adhesion between the solidified body and the mold.

The magnesium base composite materials B-1 to B-7 were examined by the X-ray diffraction whether $Mg_2Si$ and MgO were generated and also the content of $Mg_2Si$ and MgO were found. The result of measured tensile strength and hardness HRE (Rockwell hardness/E scale) are also shown in. the table 1 together with the above result. In addition, the composite materials B-1 and B-7 comprised Mg only other than $Mg_2Si$ and MgO.

In addition, the tensile strength was measured as follows.

<Measurement of Tensile Strength>

As a test sample, a test specimen (diameter: φ3.5 mm and parallel part: 14 mm) was prepared. The tensile test was performed such that the test specimen was mounted on a 10 ton autograph and a tensile load was applied at a displacement speed of 0.5 mm/minute. A value provided such that the load when the test specimen was broken was divided by a break area was regarded as the tensile strength.

TABLE 1

Table 1.
Characteristics of pressed powder molded bodies A-1 to A-7 and composite materials B-1 to B-7

| Run No. | Pressed powder molded body | Silica content (% by weight) | Composite material | Formed content by reaction (% by weight) $Mg_2Si$ | $MgO$ | Mechanical characteristics Hardness HRE | Tensile strength (Mpa) | Others |
|---|---|---|---|---|---|---|---|---|
| 1 | A-1 | 3.0  | B-1 | 3.7  | 3.9  | 52.2 | 102 | |
| 2 | A-2 | 5.0  | B-2 | 6.2  | 6.6  | 60.1 | 114 | |
| 3 | A-3 | 7.5  | B-3 | 9.4  | 9.9  | 69.8 | 132 | |
| 4 | A-4 | 10.0 | B-4 | 12.5 | 13.1 | 78.6 | 144 | |
| 5 | A-5 | 13.5 | B-5 | 16.8 | 17.8 | 87.4 | 146 | Tool wear |
| 6 | A-6 | 1.5  | B-6 | 1.7  | 1.8  | 42.5 | 68  | |
| 7 | A-7 | 0    | B-7 | 0    | 0    | 40.2 | 63  | Adhesion to tool |

It is shown that $Mg_2Si$ and $MgO$ are generated by reaction of the Mg powder and the silica powder at the heating step in the pressed powder molded bodies A-1 to A-4, that is, the composite materials B-1 to B-4. In addition, it is shown that the magnesium base composite materials have favorable mechanical characteristics and machinability because the contents of $Mg_2Si$ and $MgO$ dispersed in the composite materials are in an appropriate range.

Meanwhile, regarding the pressed powder molded body A-5, that is, the composite material B-5, since the contents of $Mg_2Si$ and $MgO$ exceed the appropriate range, there is a problem in machinability because of tool wear. In addition, regarding the pressed powder molded bodies A-6 and A-7, that is, the composite materials B-6 and B-7, since the contents of $Mg_2Si$ and $MgO$ are lower than the appropriate range, there is not sufficiently provided an improved effect of the mechanical characteristics. Especially, regarding the pressed powder molded body A-7, that is, the composite material B-7, since it is a pure Mg material, adhesion to a tool during mechanical processing is considerably increased and its machinability is lowered.

(Example 2)

As a starting raw material, pure Mg powder (average particle diameter: 112 μm), AZ91D magnesium alloy powder (average diameter: 61 μm, nominal composition: Mg-9Al-1Zn/mass %) and silica powder (average particle diameter: 24 μm) were prepared. The pure Mg powder and the silica powder were combined and the Mg alloy powder and the silica powder were combined so as to comprise 8% by weight of the silica powder based on 100% by weight of the mixture. Then, they are uniformly mixed using a ball mill and mixed powder was provided. Then, a circular mold which is 11 mm in diameter is filled with the provided mixed powder and a surface pressure of 8 t/cm$^2$ was applied to it. Thus, pressed powder molded bodies A-8 to A-17 were manufactured.

Other than the pressed powder molded bodies, a tubular furnace as would be described below was prepared. That was, the tubular furnace was filled with nitrogen gas (gas flow rate: 3 dM$^3$/min) and a temperature in the furnace was controlled at values shown in a table 2. The pressed powder molded bodies A-8 to A-17 were put in the tubular furnace and heated up and held for 30 minutes. Then, they were cooled down to a room temperature in the furnace containing the nitrogen gas and taken out of the furnace. Thus, magnesium group composite materials B-8 to B-17 were provided. They were examined by the X-ray diffraction whether $Mg_2Si$ and $MgO$ were generated and whether unreacted $SiO_2$ remained or not. The results are shown in the table 2. In addition, the composite materials B-8 to B-12 comprised Mg only other than components shown in the table 2. In addition, the composite materials B13 to B-15 and B-17 comprised components of the Mg alloy, that was, Mg, Al and Zn other than components shown in the table 2.

TABLE 2

Table 2.
Characteristics of pressed powder molded bodies A-8 to A-17 and composite materials B-8 to B-17

| Run No. | Pressed powder molded body | Combination of mixed powder | Heating temperature (° C.) | Composite material | Presence or absence detected by X-ray diffraction $Mg_2Si$ | $MgO$ | $SiO_2$ |
|---|---|---|---|---|---|---|---|
| 8  | A-8  | Mg/silica | 280 | B-8  | Presence | Presence | Absence |
| 9  | A-9  | Mg/silica | 360 | B-9  | Presence | Presence | Absence |
| 10 | A-10 | Mg/silica | 450 | B-10 | Presence | Presence | Absence |
| 11 | A-11 | Mg/silica | 520 | B-11 | Presence | Presence | Absence |
| 12 | A-12 | Mg/silica | 610 | B-12 | Presence | Presence | Absence |

TABLE 2-continued

Table 2.
Characteristics of pressed powder molded bodies A-8 to A-17 and composite materials B-8 to B-17

| Run No. | Pressed powder molded body | Combination of mixed powder | Heating temperature (° C.) | Composite material | Presence or absence detected by X-ray diffraction | | |
|---|---|---|---|---|---|---|---|
| | | | | | $Mg_2Si$ | MgO | $SiO_2$ |
| 13 | A-13 | Mg alloy/silica | 260 | B-13 | Presence | Presence | Absence |
| 14 | A-14 | Mg alloy/silica | 480 | B-14 | Presence | Presence | Absence |
| 15 | A-15 | Mg alloy/silica | 580 | B-15 | Presence | Presence | Absence |
| 16 | A-16 | Mg/silica | 200 | B-16 | Absence | Absence | Presence |
| 17 | A-17 | Mg alloy/silica | 225 | B-17 | Absence | Absence | Presence |

Regarding the pressed powder molded bodies A-8 to A-15, that is, the composite materials B-8 to B-15 which are the mixtures of the pure Mg powder and the silica powder and the mixtures of the Mg alloy powder and the silica powder, it is shown that $Mg_2Si$ and MgO are generated by a reaction of the pure Mg powder and the silica powder, or a reaction of the Mg alloy powder and the silica powder at the heating process under appropriate heating and holding conditions.

Meanwhile, according to the pressed molded bodies A-16 and A-17, that is, the composite materials B-16 and B-17, since the heating temperature conditions are lower than an appropriate range, reaction dose not progress in the heating process. As a result, $Mg_2Si$ and MgO are not generated and there remains unreacted $SiO_2$ which is the starting raw material.

(Example 3)

As a starting raw material, pure Mg powder (average particle diameter: 112 μm) and silica glass powder (average particle diameter: 45 μm) were prepared. They were combined so as to comprise 5% by weight of the silica glass powder based on 100% by weight of the mixed powder. Then, the mixture were uniformly mixed using a ball mill. Then, a circular mold which is 11 mm in diameter is filled with the provided mixed powder and a surface pressure of 8 t/cm² was applied to it and pressed powder molded bodies A-18 to A-24 were manufactured.

Other than the pressed powder molded bodies A-18 to A-24, a tubular furnace as would be described below was prepared. That was, the tubular furnace was filled with nitrogen gas (gas flow rate: 3 dm³/min) and a temperature in the furnace was controlled at values shown in a table 3. The pressed powder molded bodies A-18 to A-24 were put in the tubular furnace and heated up and held for 30 minutes. Then, they were cooled down to a room temperature in the furnace containing the nitrogen gas and taken out of the furnace. Thus, magnesium group composite materials B-18 to B-24 were provided. They were also examined by the X-ray diffraction whether $Mg_2Si$ and MgO were generated. The results are shown in the table 3. In addition, the composite materials B-18 to B-24 comprised Mg only other than components of $Mg_2Si$ and MgO shown in the table 3.

TABLE 3

Table 3
Characteristics of pressed powder molded bodies A-18 to A-24 and composite materials B-18 to B-24

| Run No. | Pressed powder molded body | Heating temperature (° C.) | Composite material | Presence or absence detected by X-ray diffraction | |
|---|---|---|---|---|---|
| | | | | $Mg_2Si$ | MgO |
| 18 | A-18 | 280 | B-18 | Presence | Presence |
| 19 | A-19 | 340 | B-19 | Presence | Presence |
| 20 | A-20 | 470 | B-20 | Presence | Presence |
| 21 | A-21 | 575 | B-21 | Presence | Presence |
| 22 | A-22 | 620 | B-22 | Presence | Presence |
| 23 | A-23 | 190 | B-23 | Absence | Absence |
| 24 | A-24 | 235 | B-24 | Absence | Absence |

Regarding the pressed powder molded bodies A-18 to A-22, that is, the composite materials B-18 to B-22, it is shown that $Mg_2Si$ and MgO are generated by a reaction of the pure Mg powder and the silica glass powder at the heating process in the pressed powder molded bodies of the pure Mg powder and the silica glass powder under appropriate heating and holding conditions.

Meanwhile, according to the pressed molded bodies A-23 and A-24, that is, the composite materials B-23 and B-24, since the heating temperature conditions are lower than the appropriate range, reaction dose not progress in the heating process. As a result, $Mg_2Si$ and MgO are not generated.

(Example 4)

As a starting raw material, pure Mg powder (average particle diameter: 165 μm), silica powder (average particle diameter: 58 μm) and Si powder (average particle diameter: 165 μm) were prepared.

Using the above, pressed powder molded bodies A-(a) to A-(c) and magnesium base composite materials B-(a) to B-(c) were provided by the following methods (a) to (c).

Method (a): the pure Mg powder and the silica powder were combined so as to comprise 4.5% by weight of the silica powder based on 100% by weight of the mixture and they were uniformly mixed by a ball mill.

Method (b): the pure Mg powder and the Si powder were combined so as to comprise 2% by weight of the Si powder based on 100% by weight of the mixture and they were uniformly mixed by the ball mill.

Method (c): the pure Mg powder and the Si powder were combined so as to comprise 4% by weight of the Si powder based on 100% by weight of the mixture and they were uniformly mixed by the ball mill.

A circular mold which is 34 mm in diameter is filled with the provided mixed powder and a surface pressure of 7 t/cm² was applied to it. Thus, the pressed powder molded bodies A-(a) to A-(c) were manufactured.

Other than the pressed powder molded bodies A-(a) to A-(c), a tubular furnace as would be described below was prepared. That was, the tubular furnace was filled with nitrogen gas (gas flow rate: 3 dm³/min) and a temperature in the furnace was controlled at 500° C. The pressed powder molded bodies A-(a) to A-(c) were put in the tubular furnace and heated up and held for 10 minutes. Then, they are taken out of the furnace and immediately solidified to have a relative density of 99% or more by a powder forging method and the solidified bodies; that was, the magnesium group composite materials B-(a) to B-(c) were provided. In addition, the conditions of the powder forging method was such that a mold temperature was 250° C. and the surface pressure was 8 t/cm² and a water-soluble lubricating agent was added to a wall surface of the mold in view of prevention of adhesion between the solid body and the mold.

The contents of $Mg_2Si$ and MgO in the magnesium base composite materials B-(a) to B-(c) were examined.

As a result, the content of $Mg_2Si$ was 5.5% by weight and that of MgO was 5.8% by weight based on 100% by weight of the composite material B-(a). In addition, the balance was only Mg.

Although the content of $Mg_2Si$ was 5.3% by weight based on 100% by weight of the composite material B-(b), MgO could not be detected. In addition, the balance was Mg only.

Although the content of $Mg_2Si$ was 11.2% by weight based on 100% by weight of the composite material B-(c), MgO could not be detected. The results are shown in a table 4. In addition, the balance was Mg only.

Thus, it was confirmed that the contents of $Mg_2Si$ in the material B-(a) and the material B-(b) were almost the same. In addition, it was confirmed that the content of $Mg_2Si$ of 11.2% by weight in the material B-(c) was almost equal to the value provided by adding the content of $Mg_2Si$ (5.5% by weight) to the content of MgO (5.8%) in the material B-(a), that is, 11.3% by weight.

<Abrasion Test>

Figure 5:
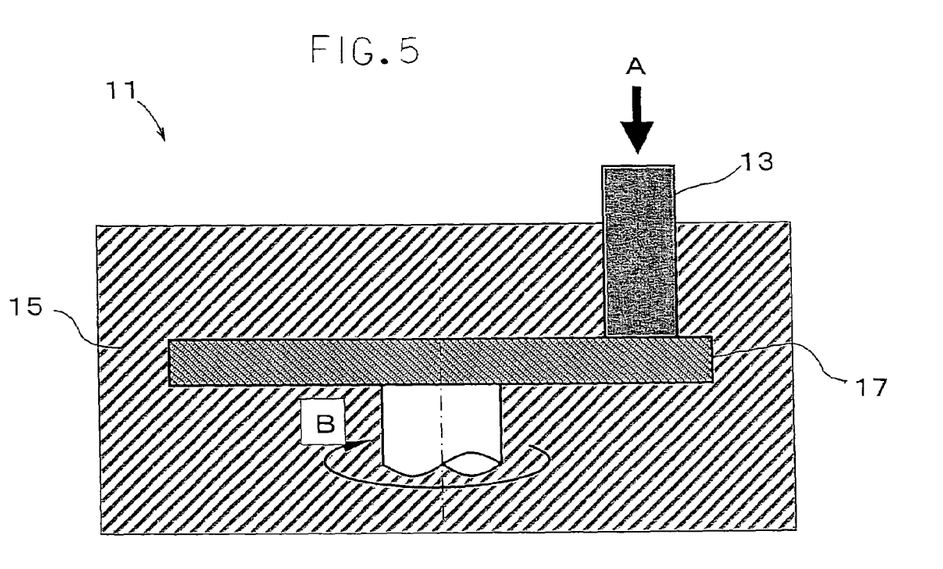
FIG. 5 is a schematic view showing a method of a abrasion test.

An abrasion test was performed on the composite materials B-(a) to B-(c). A testing method is schematically shown in FIG. 5.

Pin-shaped abrasion test specimens 13 which were 7 mm in diameter were taken from the composite materials B-(a) to B-(c). In addition, as an opponent material, a disc-shaped test specimen comprising AZ91D magnesium alloy was used.

The testing conditions are such that pressure force: 50 kg, a sliding speed: 1 m/sec, and a test time: 30 minutes, and the abrasion test was performed with the test specimens 13 and 15 soaked in a lubricating oil (engine oil) 15 under wet circumstances.

The maximum height Rmax in the sliding surface of each sample after the test was measured by a surface-roughness measuring device (surface-roughness measuring device using a stylus method) according to JIS B 0651: 1996. The results are shown in a table 4. In addition, Rmax means a maximum height in a part in which a distance of a reference length L is removed in a sectional curve and designated by the micrometer (μm). However, the measurement was made by removing the reference length only from a part in which there was no extremely high or deep part which appeared to be a flaw. In addition, the surface roughness Rmax in the sliding surface of the pin-shaped and disc-shaped abrasion test specimens before the test was 1.5 to 2.

TABLE 4

Table 4
Characteristics of pressed powder molded bodies A-(a) to A-(c) and composite materials B-(a) to B-(c)

| Run No. | Pressed powder molded body | Composite material | Formed content (% by weight) | | Rmax of surface roughness after abrasion test | |
|---|---|---|---|---|---|---|
| | | | $Mg_2Si$ | MgO | Pin-shaped test specimen | Disc-shaped test specimen |
| (a) | A-(a) | B-(a) | 5.5 | 5.8 | 8.8 | 11.2 |
| (b) | A-(b) | B-(b) | 5.3 | 0 | 12.3 | 26.5 |
| (c) | A-(c) | B-(c) | 11.2 | 0 | 7.2 | 39.4 |

According to the composite material B-(a), the surface roughness itself, that is, the value of the surface roughness of the pin-shaped abrasion test specimen is small as compared with that of the composite material B-(b) containing almost the same amount of $Mg_2Si$. In addition, according to the composite material B-(a), the surface roughness of the opponent material, that is, the surface roughness of the disc-shaped abrasion test specimen is also small which is half or less of that of the composite material B-(b). This shows that since the composite material B-(a) contains MgO as well as $Mg_2Si$, the opponent aggression is considerably improved.

In addition, when the composite material B-(a) is compared with the composite material B-(c), the following is understood. That is, it is shown that when the content of $Mg_2Si$ in the composite material is large, the abrasion resistance of the composite material itself is improved in some degree. That is, it can be seen that the value of the surface roughness of the pin-shaped abrasion test specimen of the composite material B-(c) in which the content of $Mg_2Si$ is large, becomes small. However, the surface roughness of the sliding surface of the opponent material (the surface roughness of the disc-shaped abrasion test specimen) in the composite material B-(c) is three times or more as large as that of the composite material B-(a). Therefore, it is found that the composite material B-(a) retains almost the same degree of abrasion resistance as that of the composite material B-(c), while its opponent aggression is improved.

(Example 5)

AZ31 coarse powder and silica ($SiO_2$) fine powder were prepared. In addition, as a starting raw material, graphite powder having an average particle diameter of 3 μm was used as a solid lubricating component. Their composition ratio are shown in a table 5.

TABLE 5

| | Combined composition (by weight) | | | Identified phase by | Average coefficient of | Tensile strength of extruded material |
|---|---|---|---|---|---|---|
| No. | silica | graphite | AZ31 | XRD | friction (μ) | (Mpa) |
| 1 | 3 | 0 | Remainder | MgO, Mg$_2$Si, Mg$_2$Al$_3$, Mg | 0.035 | 344 |
| 2 | 3 | 0.5 | Remainder | MgO, Mg$_2$Si, Mg$_2$Al$_3$, Mg | 0.014 | 320 |
| 3 | 3 | 1.0 | Remainder | MgO, Mg$_2$Si, Mg$_2$Al$_3$, Mg | 0.012 | 312 |
| 4 | 3 | 2.0 | Remainder | MgO, Mg$_2$Si, Mg$_2$Al$_3$, Mg | 0.011 | 306 |
| 5 | 3 | 3.0 | Remainder | MgO, Mg$_2$Si, Mg$_2$Al$_3$, Mg | 0.010 | 302 |
| 6 | 3 | 3.5 | Remainder | MgO, Mg$_2$Si, Mg$_2$Al$_3$, Mg | 0.058 | 268 |

A column-shaped pressed powder solidified body having a diameter of 40 mm was manufactured from each mixture powder and after each solidified body was heated up and held at 550° C. for 5 minutes in a tubular furnace which was filled with nitrogen gas, warm extrusion processing was immediately performed at an extrusion ratio of 25 to provide an extruded bar having a diameter of 8 mm. As a result of the X-ray diffraction for each magnesium alloy after the extrusion processing, it was confirmed that Mg$_2$Si particles were generated by a solid-phase reaction.

In order to measure the coefficient of friction by the abrasion test, a pin-shaped abrasion test specimen (its diameter: 7.8 mm) was obtained from the extruded bar. S35C steel was used as the disc material of the opponent and conditions were such that a pressing load was 500N, a sliding speed was 1 m/s and a testing time was 30 minutes in a row. In addition, the test was performed under wet lubricating conditions in which an engine lubricating oil (10W30) was dropped from the upper part of the pin-shaped test specimen such that the lubricating oil always existed on a sliding surface between the pin-shaped test specimen and the disc-shaped test specimen. The coefficients of friction calculated from measured friction torques are shown in the table 5.

According to the samples No. 1 to 5, as the content of the graphite powder serving as the lubricating component is increased, the tensile strength of the magnesium alloy is slightly lowered, but the coefficient of friction can be largely reduced.

Meanwhile, according to a sample No. 6, since the added amount of the graphite exceeds the appropriate range, the tensile strength of the extruded material is considerably lowered. As a result, since an adhesion phenomenon with the opponent material is induced by an abrasion damage of the pin-shaped test specimen at the process of the abrasion test, the coefficient of friction is increased all the more.

The invention claimed is:

1. A structural component material comprising a magnesium base composite material in which compound particles generated by a solid-phase reaction with magnesium are uniformly dispersed in a magnesium alloy body, wherein said compound particles comprise magnesium silicide (Mg$_2$Si) and magnesium oxide (MgO) generated by solid-phase reaction sintering between magnesium (Mg) and silicon dioxide (SiO$_2$) in a pressed powder molded body while heated, characterized by comprising 3 to 15 parts by weight of said magnesium silicide (Mg$_2$Si) and 3 or more parts by weight of said magnesium oxide (MgO) based on 100 parts by weight of said magnesium base composite material.

2. The structural component material comprising the magnesium base composite material according to claim 1, wherein said compound particles further comprise a SiO$_2$ component.

3. The structural component material comprising the magnesium base composite material according to claim 1, comprising 5 to 8 parts by weight of said magnesium silicide.

4. The structural component material comprising the magnesium base composite material according to claim 1, comprising 3 to 15 parts by weight of said magnesium oxide based on 100 parts by weight of the magnesium base composite material.

5. The structural component material comprising magnesium base composite material according to claim 4, comprising 5 to 8 parts by weight of said magnesium oxide.

6. The structural component material comprising the magnesium base composite material according to claim 1, wherein said magnesium base composite material comprises graphite powder as a solid lubricating agent, and a graphite powder content is 0.5 to 3% by weight in the magnesium base composite material.

7. A method of manufacturing a structural component material comprising a magnesium base composite material, comprising:

providing a mixture by mixing a first material comprising magnesium and a second material containing a SiO$_2$ component so as to comprise 2.5 to 12 parts by weight of the SiO$_2$ component based on 100 parts by weight of the total of the first and second materials;

providing a pressed powder molded body by applying pressure to said mixture; and heating said pressed powder molded body to 250° C. or more in an inert gas atmosphere or in vacuum to generate magnesium silicide (Mg$_2$Si) and magnesium oxide (MgO) in a magnesium alloy body by a solid-phase reaction sintering between Mg and SiO$_2$ in said pressed powder molded body.

8. The method of manufacturing the structural component material comprising the magnesium base composite material according to claim 7, wherein said magnesium base composite material further comprises SiO$_2$ and the SiO$_2$ is uniformly dispersed in said magnesium base composite material.

9. The method of manufacturing the structural component material comprising the magnesium base composite material according to claim 7, wherein 3 or more parts by weight of $Mg_2Si$ is contained in 100 parts by weight of said magnesium base composite material.

10. The method of manufacturing the structural component material comprising the magnesium base composite material according to claim 7, wherein 3 or more parts by weight of said MgO is contained in 100 parts by weight of said magnesium base composite material.

11. The method of manufacturing the structural component material comprising the magnesium base composite material according to claim 7, further comprising a step of grinding said mixture prior to said step of providing the pressed powder molded body.

12. The method of manufacturing the structural component comprising the magnesium base composite material according to claim 11, comprising a step of pressure bonding said mixture after said step of grinding the mixture.

13. The method of manufacturing the structural component comprising the magnesium base composite material according to claim 12, comprising a step of crushing said mixture after said step of pressure bonding the mixture.

14. The method of manufacturing the structural component comprising the magnesium base composite material according to claim 7, a heating temperature of said pressed powder molded body is 250° C. or more and not more than a melting point of magnesium.

15. The method of manufacturing the structural component comprising the magnesium base composite material according to claim 7, further comprising a step of forming a new phase in magnesium in said first material by grinding and/or pressure bonding and/or crushing said mixture prior to the step of providing said pressed powder molded body.

* * * * *